US011249577B2

(12) United States Patent
Chien et al.

(10) Patent No.: US 11,249,577 B2
(45) Date of Patent: Feb. 15, 2022

(54) TOUCH PAD AND SENSING UNIT FOR THE SAME

(71) Applicant: ELAN MICROELECTRONICS CORPORATION, Hsinchu (TW)

(72) Inventors: Yung-Lieh Chien, Taoyuan (TW); Shu-Wei Huang, Taipei (TW); Fang-Jin Lin, Hsinchu (TW); Tung-Ming Yang, Taoyuan (TW); Tien-Wen Pao, Zhubei (TW)

(73) Assignee: ELAN MICROELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 17/195,199

(22) Filed: Mar. 8, 2021

(65) Prior Publication Data
US 2021/0294474 A1 Sep. 23, 2021

(30) Foreign Application Priority Data

Mar. 19, 2020 (TW) .................................. 109109280
Jan. 5, 2021 (TW) .................................. 110100324

(51) Int. Cl.
G06F 3/041 (2006.01)

(52) U.S. Cl.
CPC ................ G06F 3/04144 (2019.05)

(58) Field of Classification Search
CPC .. G06F 3/0414; G06F 3/04144; G06F 3/0447; G06F 2203/04105
See application file for complete search history.

(56) References Cited

U.S. PATENT DOCUMENTS

| | | | |
|---|---|---|---|
| 2012/0256876 A1* | 10/2012 | Yeh | G06F 3/0445 345/174 |
| 2013/0314351 A1 | 11/2013 | Sekizawa et al. | |
| 2016/0364056 A1 | 12/2016 | Chen et al. | |
| 2018/0011565 A1* | 1/2018 | Nekimken | G06F 3/0445 |
| 2018/0307346 A1 | 10/2018 | Lee et al. | |

* cited by examiner

Primary Examiner — Priyank J Shah
(74) Attorney, Agent, or Firm — Patenttm.us

(57) ABSTRACT

A touchpad and a sending unit for the same are provided. The sensing unit has two electrode layers and a separation assembly. The separation assembly has multiple deformation rooms and multiple gap assemblies. The deformation rooms communicate with the gap assemblies. The gap assemblies communicate with the exterior environment. When the upper electrode layer is pressed and deforms in the deformation rooms, the air in the deformation rooms is discharged through the gap assemblies so that the air does not accumulate in the remaining unstressed spaces to avoid resistance and to maintain the normal operation of the force sensing function.

20 Claims, 12 Drawing Sheets

TOUCH PAD AND SENSING UNIT FOR THE SAME

CROSS-REFERENCE TO RELATED APPLICATIONS

This application is based upon and claims priority under 35 U.S.C. 119 from Taiwan Patent Application No. 109109280 filed on Mar. 19, 2020, which is hereby specifically incorporated herein by this reference thereto. This application is based upon and claims priority under 35 U.S.C. 119 from Taiwan Patent Application No. 110100324 filed on Jan. 5, 2021, which is hereby specifically incorporated herein by this reference thereto.

BACKGROUND OF THE INVENTION

1. Field of the Invention

The present invention relates to a touchpad, especially to a touchpad for an electronic device with touch-sensing and force-sensing layers.

2. Description of the Prior Arts

As the functions provided by touch devices are increasing day by day, in addition to the original touch sensing functions, many touch devices have also added force sensing functions. The conventional touch device has a touch-sensing electrode layer, a force-sensing electrode layer and a deformable separation layer. The deformable separation layer is disposed between the touch-sensing electrode layer and the force-sensing electrode layer. By the deformation of the separation layer, the force-sensing electrode layer determines the force applied to the touch-sensing electrode layer.

However, since the separation layer provides a deformable room, the air among the separation layer flows through the separation layer but cannot diffuse when the separation layer is forced to be deformed. The air may accumulate in the rest of the surrounding positions, which may cause resistance to the user's downward pressure, to affect the accuracy of the force detection.

SUMMARY OF THE INVENTION

To overcome the shortcomings, the present invention provides a modified touchpad to mitigate or to obviate the aforementioned problems.

In one aspect, the present invention provides a sensing unit comprising: first electrode layer having multiple sensing electrodes; a second electrode layer disposed on the first electrode layer and having multiple sensing electrodes; and a separation assembly disposed between the first and second electrode layers, is made of insulation materials and having multiple deformation rooms formed between the first and second electrode layers; multiple gap assemblies, each gap assembly include at least one outer gap communicating with the deformation rooms and an external environment.

In another aspect, the present invention also provides a touchpad with an aforementioned sensing unit, and a substrate and a protection layer. The sensing unit is disposed on the substrate. The protection layer is disposed on the sensing unit.

The advantages of the present invention are described as following. With the separation assembly of the sensing unit, the deformation rooms are provided between the first and second electrode layers. The air in the separation assembly can be discharged out of the deformation rooms through the gap communicating with the deformation rooms when the deformation rooms are deformed. Therefore, the accumulation of air is avoided from generating resistance, thereby maintaining the accuracy of force sensing.

Other objectives, advantages and novel features of the invention will become more apparent from the following detailed description when taken in conjunction with the accompanying drawings.

DETAILED DESCRIPTION OF THE EMBODIMENTS

With reference to the attached drawings, the present invention is described by means of the embodiment(s) below where the attached drawings are simplified for illustration purposes only to illustrate the structures or methods of the present invention by describing the relationships between the components and assembly in the present invention. Therefore, the components shown in the figures are not expressed with the actual numbers, actual shapes, actual dimensions, nor with the actual ratio. Some of the dimensions or dimension ratios have been enlarged or simplified to provide a better illustration. The actual numbers, actual shapes, or actual dimension ratios can be selectively designed and disposed and the detail component layouts may be more complicated.

Figure 1:
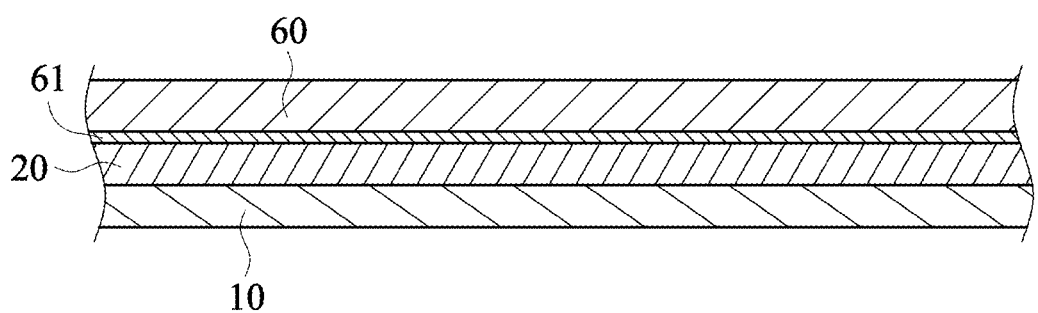
FIG. 1 is a side view in partial section of a touchpad in accordance with the present invention.

With reference to FIG. 1, a touchpad in accordance with the present invention comprises a substrate 10, a sensing unit 20 and a protection layer 60. The sensing unit 20 is disposed between the substrate 10 and the protection layer 60.

Figure 2:
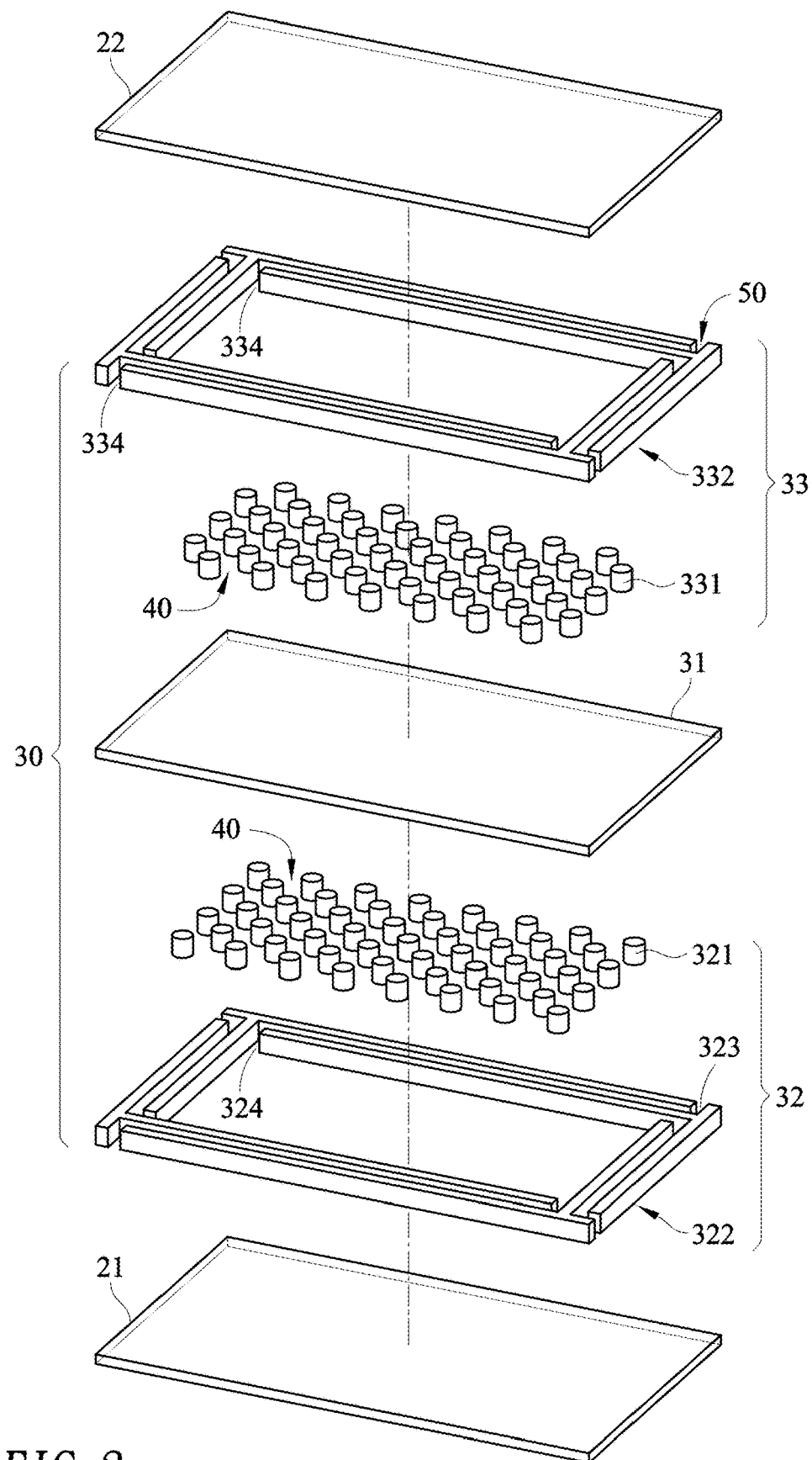
FIG. 2 is an exploded perspective view of a sensing unit of a first embodiment of a touchpad in accordance with the present invention.

With reference to FIGS. 1 and 2, the sensing unit 20 comprises a first electrode layer 21, a second electrode layer 22 and a separation assembly 30. The first electrode layer 21 is disposed on the substrate 10. The protection layer 60 is disposed on the second electrode layer 22. In one embodiment, the first electrode layer 21 is a force-sensing electrode layer to sense the downward force applied on the protection layer 60 by a user's fingers or other touch objects. The second electrode layer 22 is a touch-sensing electrode layer to sense single-finger and multi-finger touch gesture operations performed on the protection layer 60 by the user's fingers or other touch objects. In one embodiment, the second electrode layer 22 is adhered to the protection layer 60 via an adhesive layer 61. In another embodiment, the second electrode layer 22 is formed on a bottom surface of the protection layer 60.

Figure 4A:
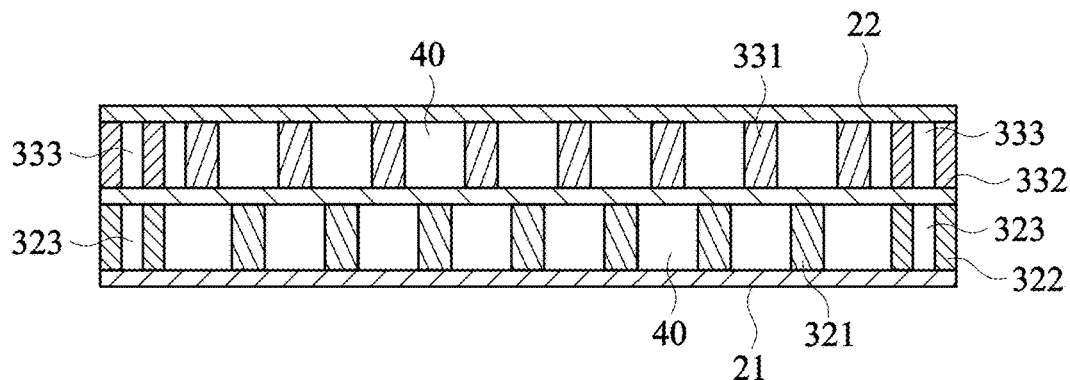
FIG. 4A is a side view in partial section of the sensing unit along line A-A in FIG. 3.
Figure 4B:
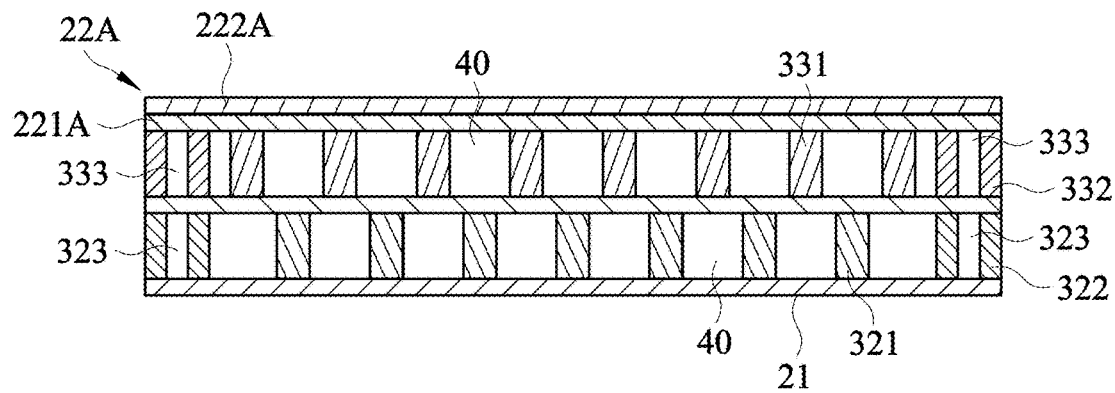
FIG. 4B is another side view in partial section of another embodiment of a sensing unit of a touchpad in accordance with the present invention.

With reference to FIG. 4A, the first electrode layer 21 and the second electrode layer 22 have multiple sensing electrodes formed thereon. In one embodiment, the second electrode layer 22 is a single electrode layer and has multiple driving and receiving electrodes. In another embodiment as shown in FIG. 4B, the second electrode layer 22A is a dual-electrode layer and has a driving electrode layer 221A and a sensing electrode layer 222A. The driving electrode layer 221A is disposed between the sensing electrode layer 222A and the separation assembly 30. Since the driving electrode layer 221A is disposed between the sensing electrode layer 222A and the first electrode layer 21, the driving electrode layer 221A may shield the first electrode layer 21 from external noise when the driving electrode layer 221A is provided with a driving signal.

Figure 3:
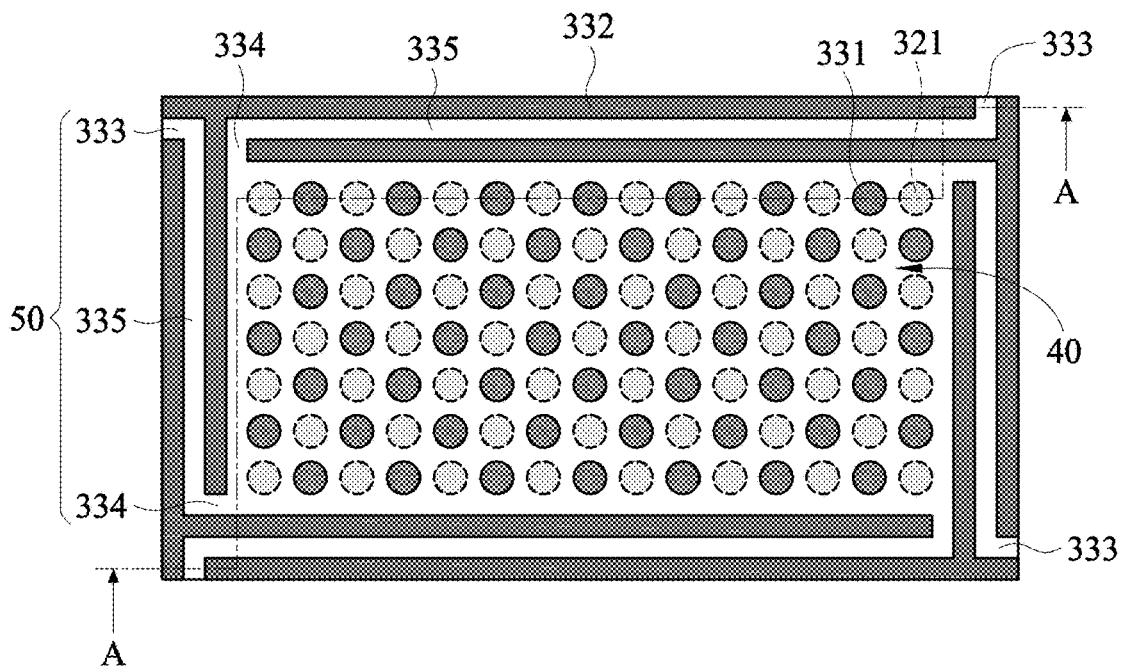
FIG. 3 is a top view of a separation assembly of the sensing unit in FIG. 2.

With reference to FIGS. 2 and 3, the separation assembly 30 is made of insulation materials, is disposed between the first electrode layer 21 and the second electrode layer 22 and has a partition layer. The partition layer includes multiple deformation rooms 40 and at least one gap assembly 50. Each gap assembly 50 comprises an outer gap 333, an inner gap 334 and an air channel 335. The inner gap 334 communicates with the deformation rooms 40. The outer gap 333 communicates with the external environment. The inner gap 334 misaligns with the outer gap 333 and communicates with each other through the air channel 335.

When the user presses the protection layer 60 via the finger or other touch object, the second electrode layer 22 is forced to compress the separation layer of the separation assembly 30 so that the separation layer of the separation assembly 30 is deformed. Since the gap assembly 50 is formed, the air in the deformation rooms 40 corresponding to the deformed separation layer exhausts through the gap assembly 50. Thus, the air is kept from accumulating in the deformation rooms 40. The fewer the accumulated air is, the less the downward pressure resistance is. Therefore, touchpad as described maintains the accuracy for detecting the downward pressure. The separation assembly 30 is implemented in a variety of embodiments. Several specific embodiments are described as following, but are not limited thereto.

A first embodiment of the separation assembly 30 is shown in FIGS. 2, 3 and 4A. The separation assembly 30 comprises an intermediate layer 31, a first separation layer 32 and a second separation layer 33. The first separation layer 32 is disposed between the intermediate layer 31 and the first electrode layer 21. The second separation layer 33 is disposed between the intermediate layer 31 and the second electrode layer 22. The intermediate layer 31 is made of deformable materials such as polyethylene terephthalate (PET) and so on. The first separation layer 32 comprises multiple first mid-spacers 321 and a first peri-spacer assembly 322. The first mid-spacers 321 are arranged separately to form some of the deformation rooms 40. The first peri-spacer assembly 322 surrounds the first mid-spacers 321. The second separation layer 33 comprises multiple second mid-spacers 331 and a second peri-spacer assembly 332. The second mid-spacers 331 are arranged separately to form some of the deformation rooms 40. The second peri-spacer assembly 332 surrounds the second mid-spacers 331. The first and second mid-spacers 321, 331 correspondingly distribute in a sensing area of the first and second electrode layers 21, 22. The first and second peri-spacer assemblies 322, 332 correspondingly distribute out of the sensing area of the first and second electrode layers 21, 22. Furthermore, in accordance with the configuration of the deformable intermediate layer 31, the first and second mid-spacers 321, 331 and the first and second peri-spacer assemblies 322, 332 may be made of non-deformable hard materials.

In the first embodiment, the first peri-spacer assembly 322 has multiple sides. Each side corresponds to an edge of the touchpad. At least one of the sides has the gap assembly 50 formed thereon. Each gap assembly 50 in the first peri-spacer assembly 322 includes an outer gap 323 and an inner gap 324. The outer gap 323 and the inner gap 324 misalign with each other and communicate to each other through an air channel 325. The outer gap 323 communicates with an external environment. The inner gap 324 communicates with the deformation rooms 40. The second peri-spacer assembly 332 has multiple sides. Each side corresponds to an edge of the touchpad. At least one of the sides has the gap assembly 50 formed thereon. Each gap assembly 50 in the second peri-spacer assembly 332 includes an outer gap 333 and an inner gap 334. The outer gap 333 and the inner gap 334 misalign with each other and communicate to each other through an air channel 335. The outer gap 333 communicates with an external environment. The inner gap 334 communicates with the deformation rooms 40. When the external moisture try to flow into the deformation rooms 40, the external moisture must pass through the air channels 325 and 335 before it can flow into the deformation rooms 40. Thus, with the air channels 325, 335, the external moisture does not flow into the deformation rooms 40 directly to keep the moisture from existing between the first and second electrode layers 21, 22 to further influence the touch-sensing effect. In this embodiment, the outer gaps 323, 333 and the inner gaps 324, 334 are respectively located at two ends of the corresponding side.

In the first embodiment, the inner gaps 324, 334 of the first peri-spacer assembly 322 and the second peri-spacer assembly 332 on the same side align with each other. The outer gaps 323, 333 of the first peri-spacer assembly 322 and the second peri-spacer assembly 332 on the same side align with each other.

In the first embodiment, the first mid-spacers 321 and the second mid-spacers 331 have the same size and are respectively arranged in a matrix form the deformation rooms 40. However, each first mid-spacer 321 misaligns with any one of the second mid-spacers 331 along the longitudinal axis, i.e. that each first mid-spacer 321 does not overlap any one of the second mid-spacers 331 in the longitudinal axis.

Figure 5:
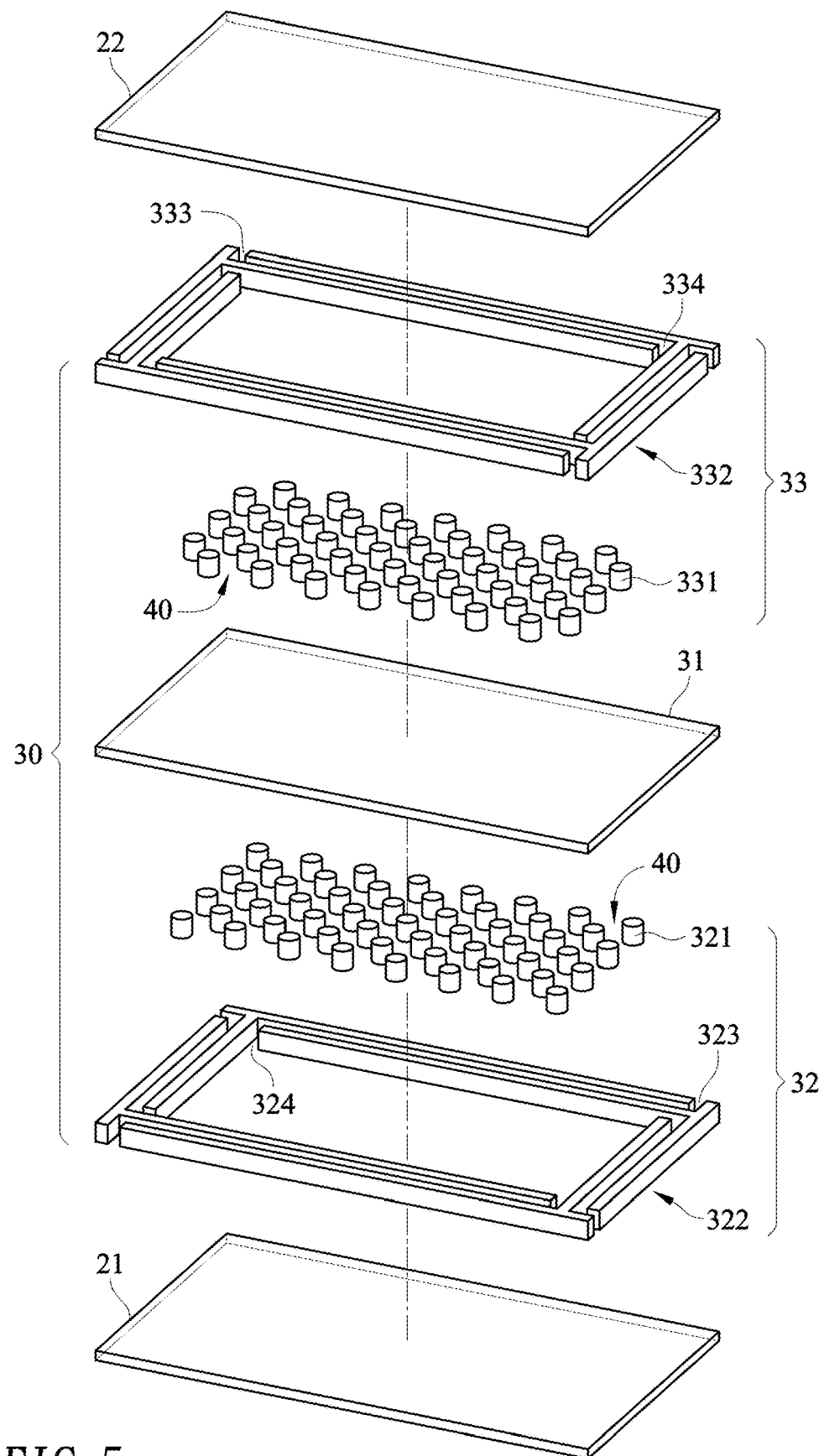
FIG. 5 is an exploded perspective view of a sensing unit of a second embodiment of a touchpad in accordance with the present invention.
Figure 6:
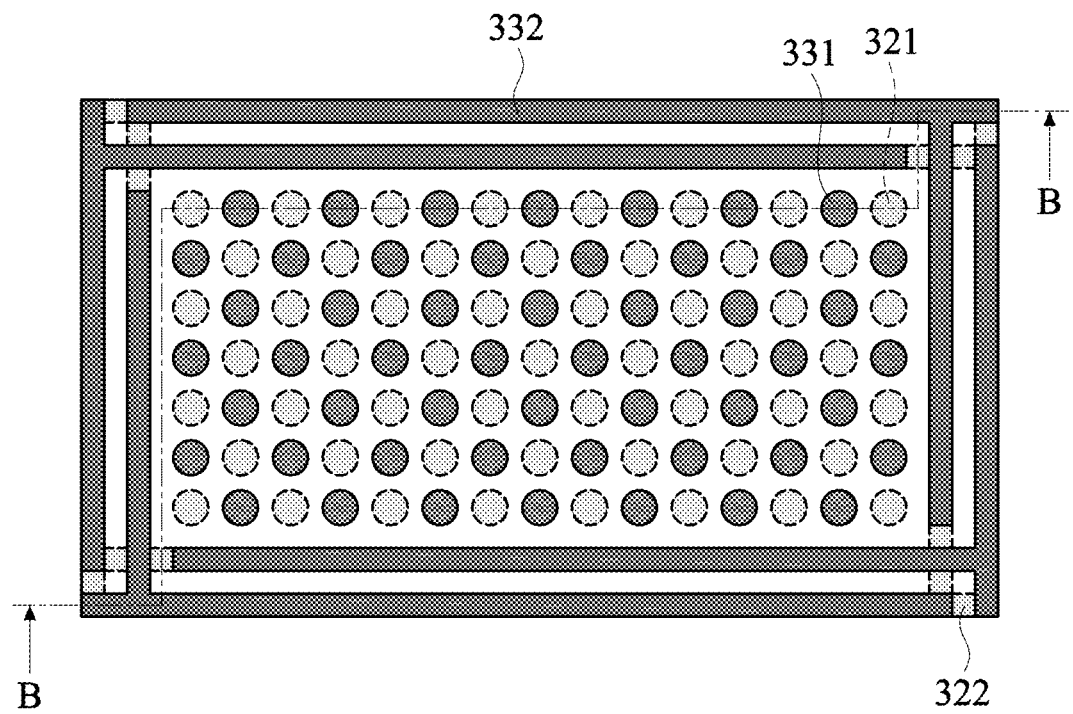
FIG. 6 is a top view of a separation assembly of the sensing unit in FIG. 5.
Figure 7:
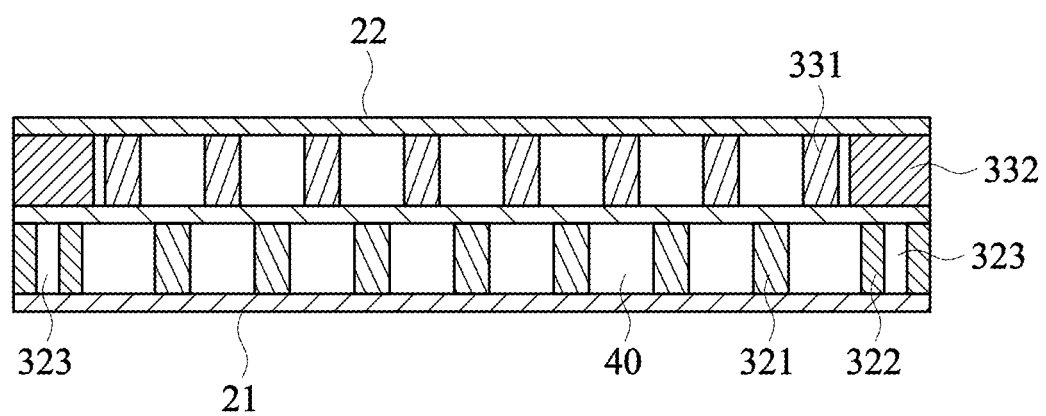
FIG. 7 is a side view in partial section of the sensing unit along line B-B in FIG. 6.

With reference to FIGS. 5 to 7, a second embodiment of the separation assembly 30 is similar to the first embodiment. In the second embodiment, the inner gaps 324, 334 of the first and second peri-spacer assembly 322, 332 on the same side misalign with each other. The outer gaps 323, 333 of the first and second peri-spacer assembly 322, 332 on the same side also misalign with each other. For example, the direction of FIG. 6 is used as a reference. The outer gap 323 of the first peri-spacer assembly 322 on the top side is located at the right end and the inner gap 324 of the first peri-spacer assembly 322 is located at the left end. The outer gap 333 of the second peri-spacer assembly 332 on the top side is located at the left end and the inner gap 334 of the second peri-spacer assembly 332 is located at the right end.

Figure 8A:
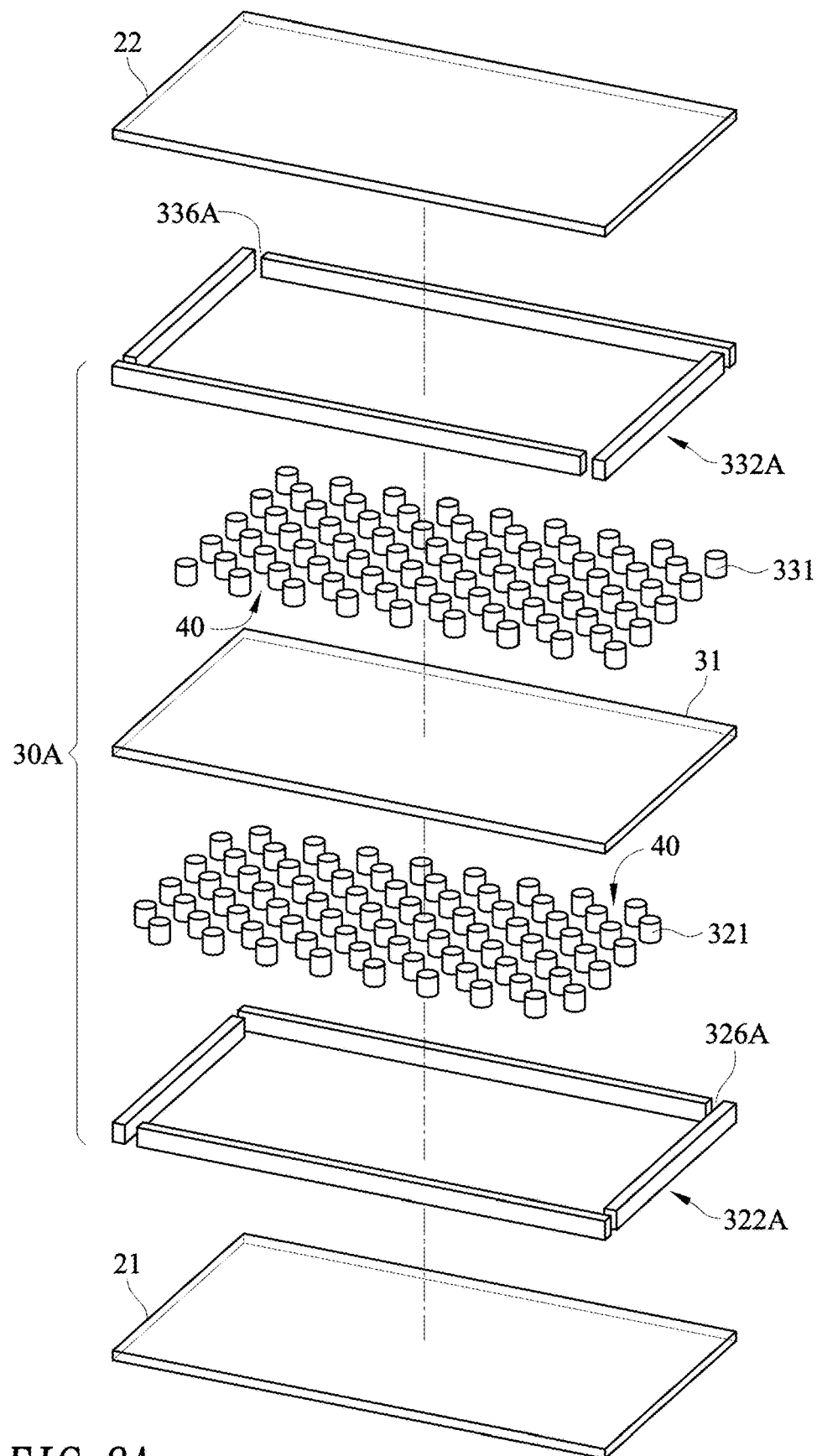
FIG. 8A is an exploded perspective view of a sensing unit of a third embodiment of a touchpad in accordance with the present invention.
Figure 8B:
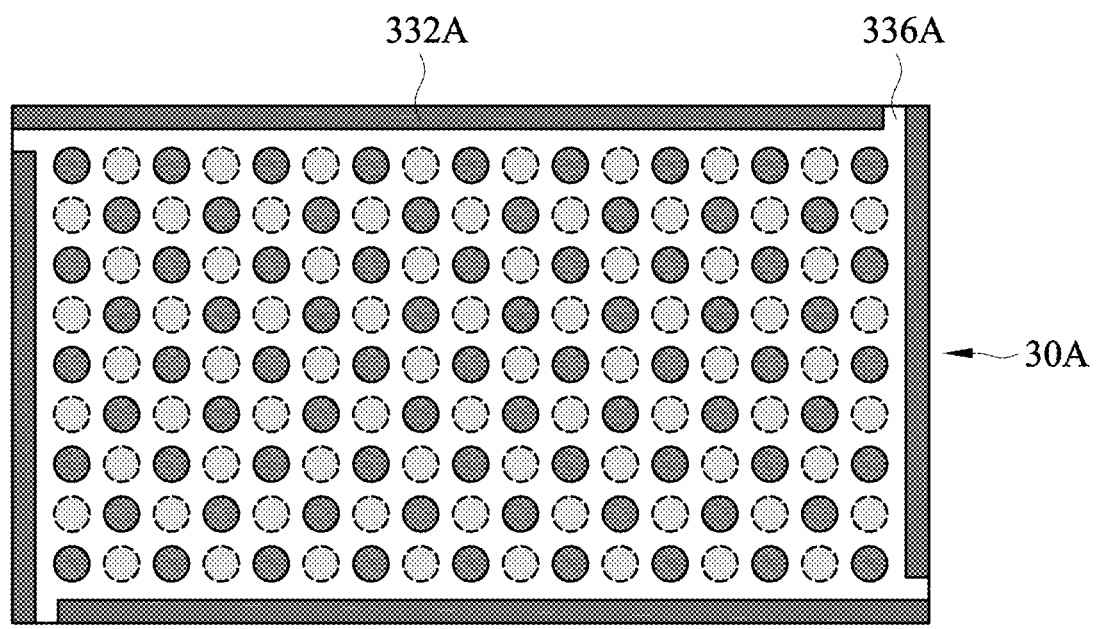
FIG. 8B is a top view of a separation assembly of the sensing unit in FIG. 8A.

With reference to FIGS. 8A and 8B, a third embodiment of the separation assembly 30A is similar to the first embodiment. In the third embodiment, each side of the first peri-spacer separation assembly 322A has an outer gap 326A formed thereon. Each side of the second peri-spacer separation assembly 332A has an outer gap 336A formed thereon. The outer gaps 326A, 336A of the first and second peri-spacer assembly 322A, 332A on the same side misalign with each other.

Figure 9:
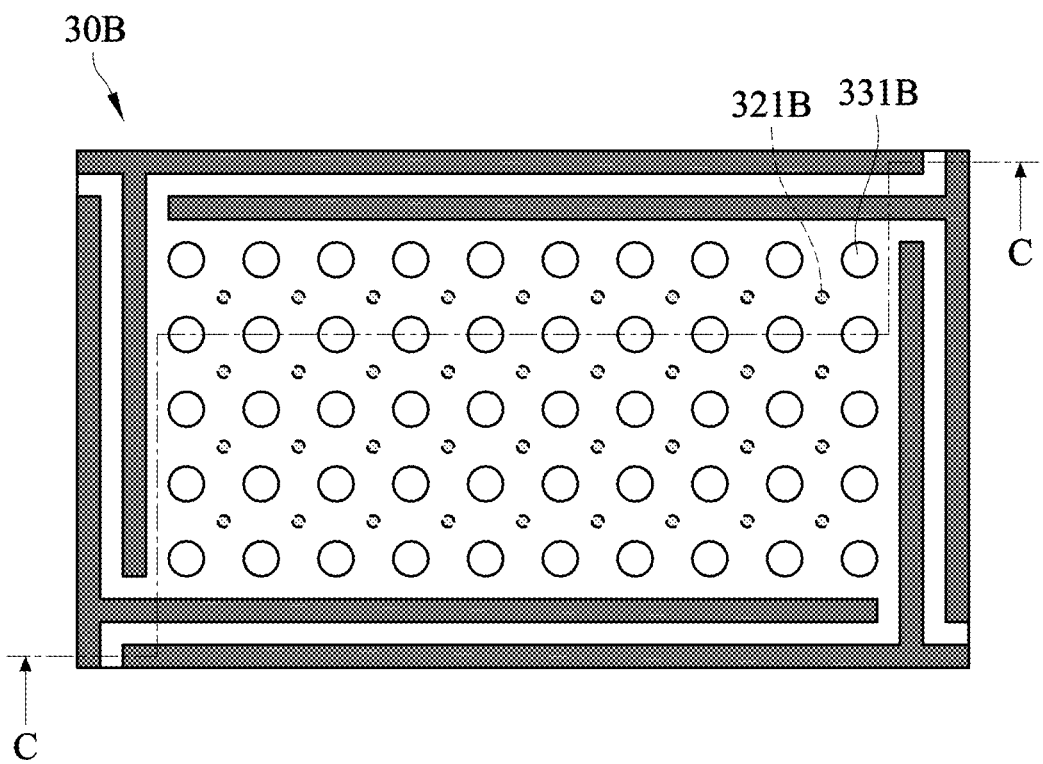
FIG. 9 is a top view of a separation assembly of a sensing unit of a fourth embodiment of a touchpad in accordance with the present invention.
Figure 10:
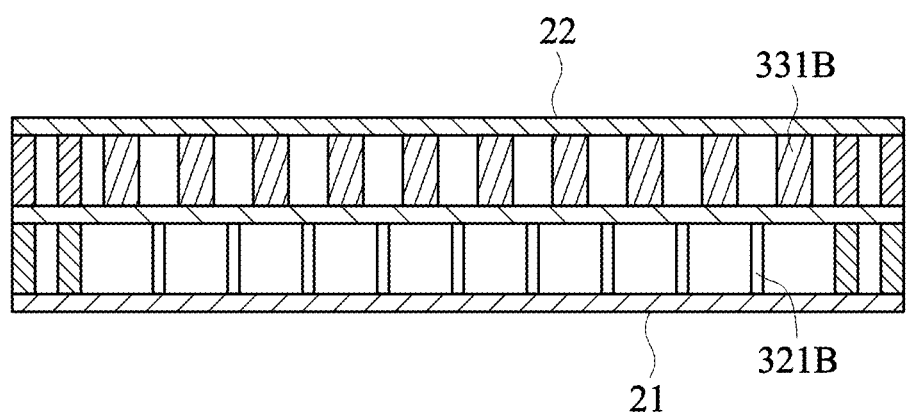
FIG. 10 is a side view in partial section of the sensing unit along line C-C in FIG. 9.

With reference to FIGS. 9 and 10, a fourth embodiment of the separation assembly 30B is similar to the first embodiment. In this embodiment, the size of the first mid-spacers 321B and the size of the second mid-spacers 331B are different.

Figure 11:
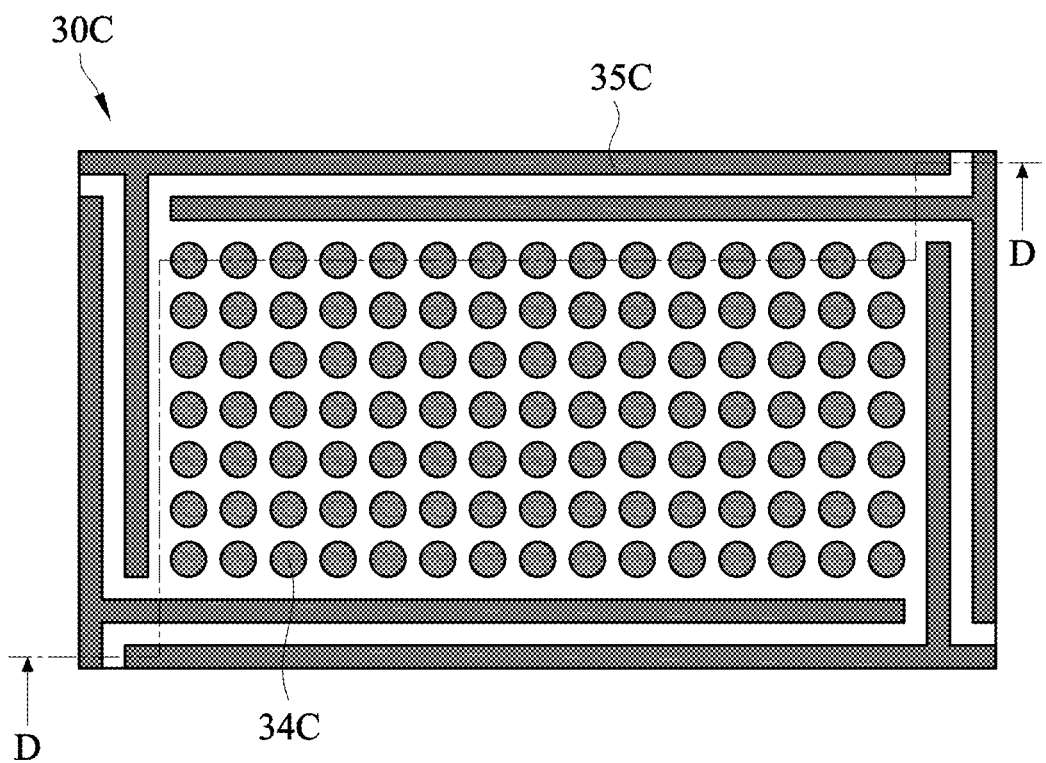
FIG. 11 is a top view of a separation assembly of a sensing unit of a fifth embodiment of a touchpad in accordance with the present invention.
Figure 12:
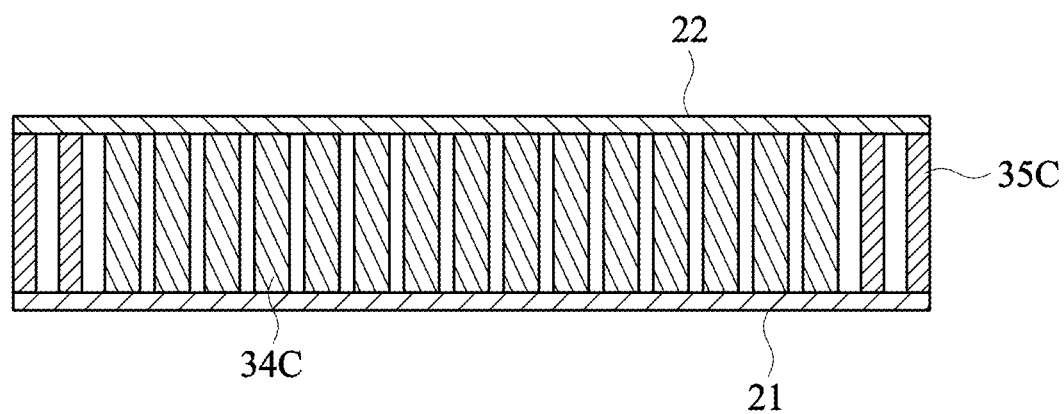
FIG. 12 is a side view in partial section of the sensing unit in along line D-D FIG. 11.

With reference to FIGS. 11 and 12, a fifth embodiment of the separation assembly 30C comprises multiple mid-spacers 34C and a peri-spacer assembly 35C. The peri-spacer assembly 35C is equal to the first peri-spacer assembly in the first embodiment and is not repeated here. The mid-spacers 34C are clamped between the first and second electrode layers 21, 22. The mid-spacers 34C are arranged in a matrix to form the deformation rooms. The mid-spacers 34C are made of deformable material and has an elastic recovery capability.

Figure 13:
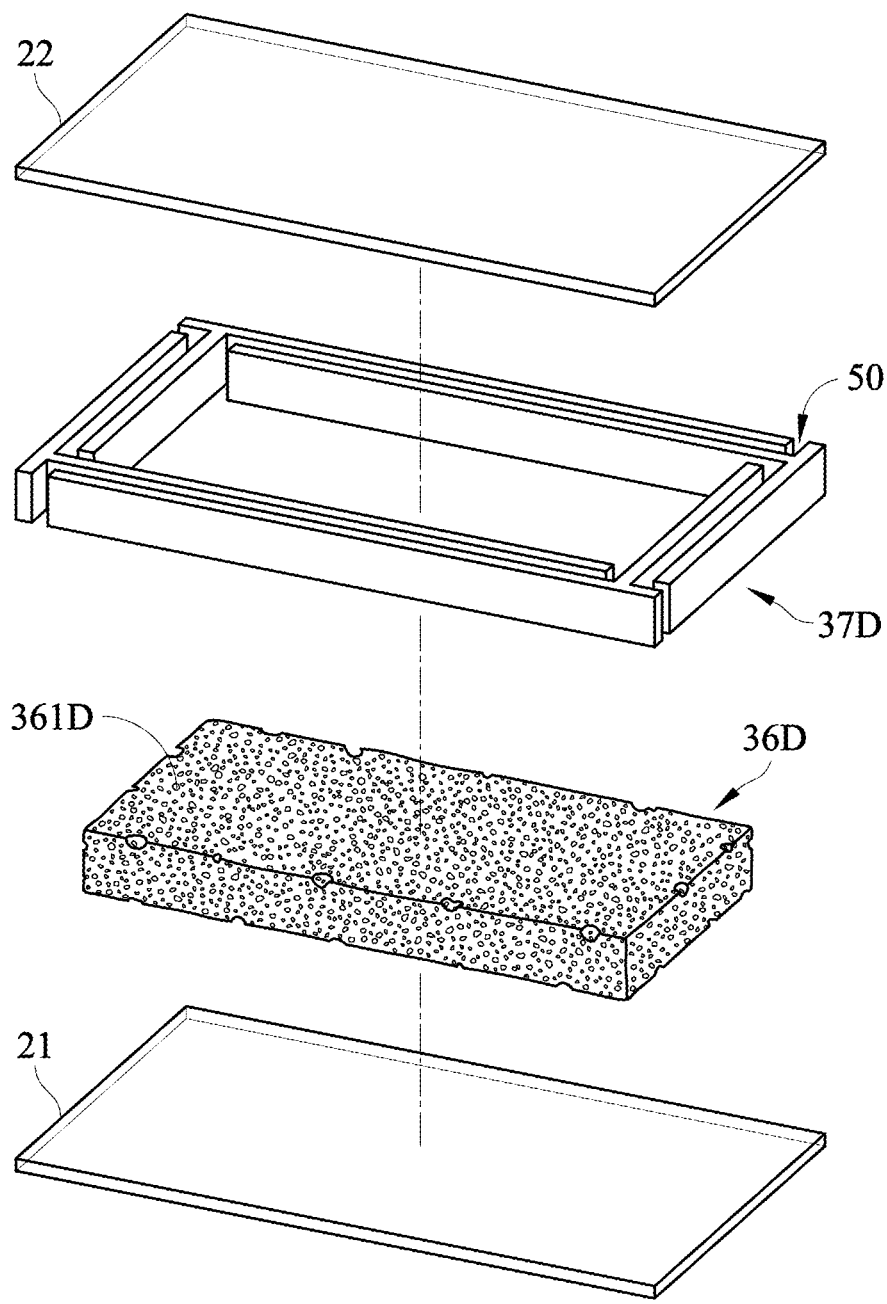
FIG. 13 is an exploded perspective view of a sensing unit of a sixth embodiment of a touchpad in accordance with the present invention.
Figure 14:
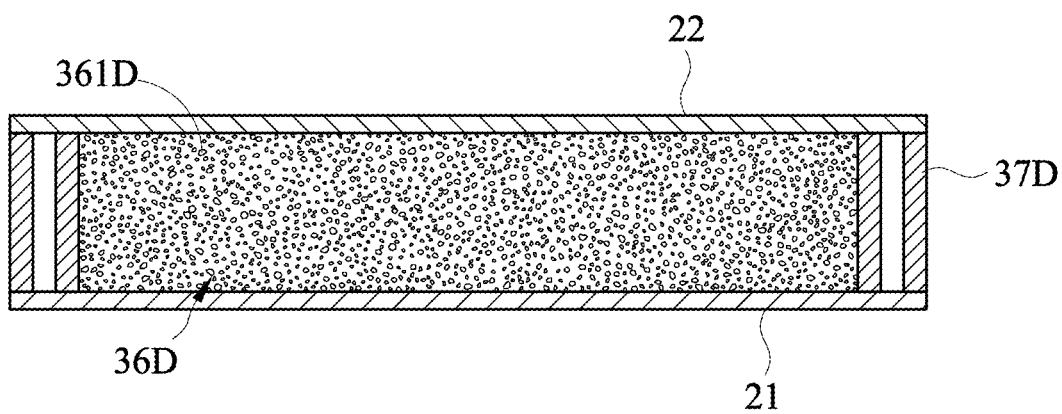
FIG. 14 is a side view in partial section of the sensing unit in FIG. 13.

With reference to FIGS. 13 and 14, a sixth embodiment of the separation assembly 30D comprises a mid-spacer 36D and a peri-spacer assembly 37D. The peri-spacer assembly 37D is equal to the first peri-spacer assembly in the first embodiment and is not repeated here. The mid-spacer 36D is deformable and is clamped between the first and second electrode layers 21, 22. The mid-spacer 36D has multiple interlacing pores 361D to form the deformation rooms. The pores 361D communicate with each other. When the mid-spacer 36D is compressed, the air flows through the pores 361D to flow out from the gap assembly 50. In one embodiment, the mid-spacer 36D may be made of foam or other porous materials.

Figure 15A:
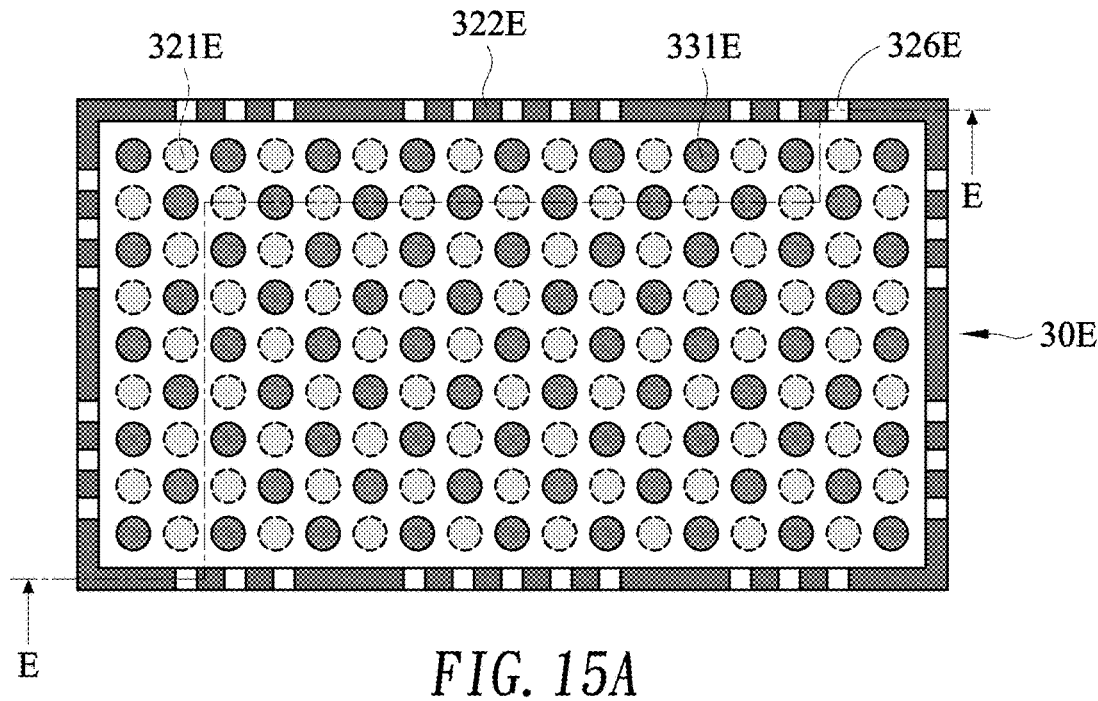
FIG. 15A is a top view of a separation assembly of a sensing unit of a seventh embodiment of a touchpad in accordance with the present invention.
Figure 15B:
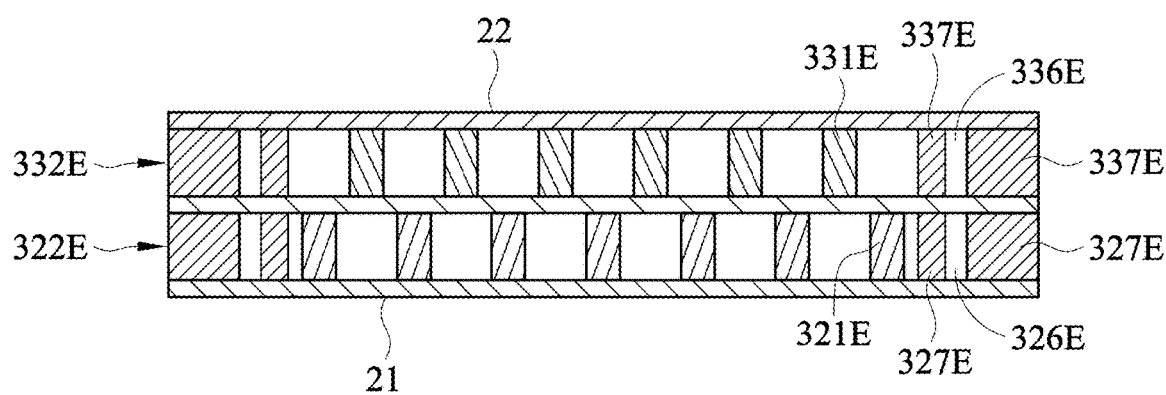
FIG. 15B is a side view in partial section of the sensing unit in along line D-D FIG. 15A.

With reference to FIGS. 15A and 15B, a seventh embodiment of the separation assembly 30E is similar to the first embodiment. In the seventh embodiment, the first peri-spacer assembly 322E includes multiple first peri-spacers 327E and multiple outer gaps 326E. The first peri-spacers 327E are disposed correspondingly to the edges of the touchpad and surround the first mid-spacers 321E. Each of the outer gaps 326E is formed between adjacent two of the first peri-spacers 327E. The first peri-spacer assembly 322E corresponds to any one of the edges of the touchpad. Each side of the first peri-spacer assembly 322E has one of the gap assemblies formed thereon. Each gap assembly has at least two outer gaps 326E. The second peri-spacer assembly 332E includes multiple second peri-spacers 337E and multiple outer gaps 336E. The second peri-spacers 337E are disposed correspondingly to the edges of the touchpad and surround the second mid-spacers 331E. Each of the outer gaps 336E is formed between adjacent two of the second peri-spacers 337E. The second peri-spacer assembly 332E corresponds to any one of the edges of the touchpad. Each side of the second peri-spacer assembly 332E has one of the gap assemblies formed thereon. Each gap assembly has at least two outer gaps 336E. Each first peri-spacer 327E aligns with one of the second peri-spacers 337E to align each outer gap 326E of the first peri-spacer assembly 322E to one of the outer gaps 336E of the second peri-spacer assembly 332E.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A touchpad having an outside and the touchpad comprising:
   a substrate;
   a sensing unit disposed on the substrate and comprising
      a first electrode layer disposed on the substrate and having multiple sensing electrodes;
      a second electrode layer having multiple sensing electrodes; and
      a separation assembly disposed between the first electrode layer and the second electrode layer, being made of insulation materials and having
         multiple deformation rooms formed between the first electrode layer and the second electrode layer;
         multiple gap assemblies, each gap assembly including at least one outer gap communicating with the deformation rooms and the outside; and
   a protection layer disposed on the second electrode layer.

2. The touchpad as claimed in claim 1, wherein
   the separation assembly comprises a intermediate layer, a first separation layer and a second separation layer;
   the intermediate layer is disposed between the first separation layer and the second separation layer;
   the first separation layer is disposed between the intermediate layer and the first electrode layer and has
      multiple first mid-spacers arranged separately to form several of the deformation rooms; and
      a first peri-spacer assembly surrounding the first mid-spacers;
   the second separation layer is disposed between the intermediate layer and the second electrode layer and has
      multiple second mid-spacers arranged separately to form several of the deformation rooms; and
      a second peri-spacer assembly surrounding the second mid-spacers;
   the gap assemblies formed in the first peri-spacer assembly and second peri-spacer assembly.

3. The touchpad as claimed in claim 2, wherein
the first peri-spacer assembly includes
multiple sides; and
multiple first peri-spacers distributing and surrounding the first mid-spacers;
the second peri-spacer assembly includes
multiple sides; and
multiple second peri-spacers distributing and surrounding the second mid-spacers;
each side of the first and second peri-spacer assemblies has one of the gap assemblies formed thereon;
each gap assembly includes multiple outer gaps; and
each outer gap is formed between adjacent two of the first peri-spacers and the second peri-spacers.

4. The touchpad as claimed in claim 3, wherein
each first peri-spacer aligns with one of the second peri-spacers; and
each outer gap between the first peri-spacers aligns with one of the outer gaps between the second peri-spacers.

5. The touchpad as claimed in claim 2, wherein
the first mid-spacers are arranged in a matrix;
the second mid-spacers are arranged in a matrix; and
each first mid-spacer misaligns with anyone of the second mid-spacers on a longitudinal axis of the touchpad.

6. The touchpad as claimed in claim 4, wherein
the first mid-spacers are arranged in a matrix;
the second mid-spacers are arranged in a matrix; and
each first mid-spacer misaligns with anyone of the second mid-spacers on a longitudinal axis.

7. The touchpad as claimed in claim 5, wherein
the first mid-spacers have at least two different sizes; and
the second mid-spacers have at least two different sizes.

8. The touchpad as claimed in claim 5, wherein a size of each first mid-spacer is different to a size of each second mid-spacer.

9. The touchpad as claimed in claim 1, wherein
the separation assembly comprises
multiple mid-spacers arranged in a single layer and in a matrix; and
a peri-spacer assembly;
the deformation rooms are formed between the mid-spacers; and
the gap assemblies are formed in the peri-spacer assembly.

10. The touchpad as claimed in claim 1, wherein
the separation assembly comprises
a mid-spacer having multiple interlacing pores communicating with each other to form the deformation rooms; and
a peri-spacer assembly; and
the assemblies are formed in the peri-spacer assembly.

11. A sensing unit having an outside and the sensing unit comprising:
a first electrode layer having multiple sensing electrodes;
a second electrode layer having multiple sensing electrodes; and
a separation assembly disposed between the first electrode layer and the second electrode layer, being made of insulation materials and having
multiple deformation rooms formed between the first electrode layer and the second electrode layer;
multiple gap assemblies, each gap assembly include at least one outer gap communicating with the deformation rooms and the outside.

12. The sensing unit as claimed in claim 11, wherein
the separation assembly comprises a intermediate layer, a first separation layer and a second separation layer;
the intermediate layer is disposed between the first separation layer and the second separation layer;
the first separation layer is disposed between the intermediate layer and the first electrode layer and has
multiple first mid-spacers arranged separately to form several of the deformation rooms; and
a first peri-spacer assembly surrounding the first mid-spacers;
the second separation layer is disposed between the intermediate layer and the second electrode layer and has
multiple second mid-spacers arranged separately to form several of the deformation rooms; and
a second peri-spacer assembly surrounding the second mid-spacers;
the gap assemblies formed in the first peri-spacer assembly and the second peri-spacer assembly.

13. The sensing unit as claimed in claim 12, wherein
the first peri-spacer assembly includes
multiple sides; and
multiple first peri-spacers distributing and surrounding the first mid-spacers;
the second peri-spacer assembly includes
multiple sides; and
multiple second peri-spacers distributing and surrounding the second mid-spacers;
each side of the first and second peri-spacer assemblies has one of the gap assemblies formed thereon;
each gap assembly includes multiple outer gaps; and
each outer gap is formed between adjacent two of the first peri-spacers and the second peri-spacers.

14. The sensing unit as claimed in claim 13, wherein
each first peri-spacer aligns with one of the second peri-spacers; and
each outer gap between the first peri-spacers aligns with one of the outer gaps between the second peri-spacers.

15. The sensing unit as claimed in claim 12, wherein
the first mid-spacers are arranged in a matrix;
the second mid-spacers are arranged in a matrix; and
each first mid-spacer misaligns with anyone of the second mid-spacers on a longitudinal axis.

16. The sensing unit as claimed in claim 14, wherein
the first mid-spacers are arranged in a matrix;
the second mid-spacers are arranged in a matrix; and
each first mid-spacer misaligns with anyone of the second mid-spacers on a longitudinal axis.

17. The sensing unit as claimed in claim 15, wherein
the first mid-spacers have at least two different sizes; and
the second mid-spacers have at least two different sizes.

18. The sensing unit as claimed in claim 15, wherein a size of each first mid-spacer is different to a size of each second mid-spacer.

19. The sensing unit as claimed in claim 11, wherein
the separation assembly comprises
multiple mid-spacers arranged in a single layer and in a matrix; and
a peri-spacer assembly;
the deformation rooms are formed between the mid-spacers; and
the gap assemblies are formed in the peri-spacer assembly.

20. The sensing unit as claimed in claim 11, wherein the separation assembly comprises
- a mid-spacer having multiple interlacing pores communicating with each other to form the deformation rooms; and
- a peri-spacer assembly; and the assemblies are formed in the peri-spacer assembly.

* * * * *